Patented Nov. 22, 1932

1,888,633

UNITED STATES PATENT OFFICE

SHOICHIRO HORI, OF YOYOHATACHO, TOYOTAMAGUN, TOKYO-FU, JAPAN

PROCESS FOR MANUFACTURING AMMONIUM SULPHATE OR SALTS CONTAINING IT

No Drawing. Application filed October 23, 1930. Serial No. 490,825.

This invention relates to a process for manufacturing ammonium sulphate or salts containing it such as double or complex salt of ammonium sulphate, consisting in dissolving ammonium sulphite in saturated solution of ammonium sulphate containing or not containing salts of alkalis or salts of alkaline earth metals and in subjecting said solution to the action of oxygen or gases containing oxygen under the normal or a high pressure through contact, and the invention has for its object to manufacture ammonium sulphate or salts containing it in crystalline form in a simple and economical manner simply by oxidizing ammonium sulphite in the solution without evaporating or concentrating operation.

After years of researches, the inventor has discovered that the velocity of catalytic oxidation of ammonium sulphite in the solution with oxygen or gases containing oxygen depends much on the composition of said solution, for example, when concentrations of ammonia and sulphurous acid in the solution are equivalent, that is to say, when they are in the same proportion as in the case of ammonia and sulphur dioxide in $(NH_4)_2SO_3$, the velocity is greatest. When the concentration of ammonia exceeds said value, the velocity decreases considerably. The excess of sulphur dioxide affects little. The increase of the concentration of ammonium sulphite reduces the velocity considerably, while the effect of ammonium sulphate in solution is small. It is because ammonium sulphate is stable, while ammonium sulphite is unstable so that it decomposes by hydrolysis and hinders the oxidation. The higher the concentration of ammonium sulphite is, the more the oxidation is hindered. In short, the velocity of the oxidation of ammonium sulphite of a given concentration is considerably retarded by ammonia, less retarded by ammonium sulphite, and far less retarded by sulphurous acid, and least retarded by ammonium sulphate. Based on these facts, the process described in this specification has been invented.

A process has been known to oxidize dilute water solution of ammonium sulphite. According to this process, expensive evaporating and concentrating operations are required in order to obtain ammonium sulphate in crystalline form, although the oxidation can be effected in a short time.

Another process has been tried to start from concentrated water solution of ammonium sulphite and to convert it to water solution of ammonium sulphate of such concentration as to reduce the cost of evaporating and concentrating operations. However, according to this process, the oxidation of concentrated water solution of ammonium sulphite requires much time. Because of these defects, the manufacture of ammonium sulphate by oxidizing ammonium sulphite in water solution has not been done on a large scale.

According to this invention, ammonium sulphite is dissolved in saturated water solution of ammonium sulphate containing or not containing salts of alkalis or salts of alkaline earth metals and ammonium sulphite in said solution is oxidized catalytically with oxygen or gases containing oxygen. And then ammonium sulphite is converted to ammonium sulphate which immediately crystallizes from the mother liquor, whereby expensive evaporating or concentrating operation can be done away with. In this manner, ammonium sulphate of crystalline form can be produced at a low cost.

In the known processes, ammonium sulphite which has not been oxidized and is in an unstable state is lost through decomposition during the evaporating or concentrating operation. Therefore, the oxidation should be effected completely and catalyzers of weak strength can not be used. In the present process, on the contrary, only the ammonium sulphite oxidized to ammonium sulphate will crystallize so that there will be not loss of it. Therefore, catalyzers of weak strength such as salts of copper, nickel, or iron can be used. As catalyzers remain in the solution and only parts of them which adhere to the surfaces of the crystals are lost, catalyzers such as complex salts of cobalt which are expensive but of strong strength may be used economically.

If compressed oxygen or gases containing oxygen is employed, the oxidation of ammonium sulphite in the solution will be effected very quickly evolving much heat. So, when a great quantity of ammonium sulphite is treated, effective cooling means should be provided for the oxidizing apparatus. If saturated solution of ammonium sulphate containing salts of alkalis or salts of alkaline earth metals is used, the heat evolved by oxidation will be distributed among said salts so as to facilitate the operation.

With certain kinds of the added salts, complex or double salts of ammonium sulphate are produced which may serve as mixed manures. Such salts are potassium sulphate, calcium nitrate, potassium phosphate, ammonium nitrate etc.

In order to secure a good contact, oxygen or gases containing oxygen may be blown into the solution in bubbles or the solution may be sprayed into the gases in fine mists.

If ammonium sulphite is supplied gradually into the oxidizing apparatus containing concentrated solution of ammonium sulphate with or without salts of alkalis or salts of alkaline earth metals, the concentration of ammonium sulphite in the solution will be kept low so as to facilitate the reaction.

Besides ammonium sulphite, acid ammonium sulphite and ammonia may be used, or water solution of sulphurous acid and ammonia may be supplied into the oxidizing apparatus separately, or sulphur dioxide, ammonia, and water may be supplied into the oxidizing apparatus. In short, the materials to be used may be in liquid, gaseous, solid or dissolved state and may be supplied into the oxidizing apparatus separately or in combination. In this system ammonium sulphate or salts containing it deposit in the oxidizing apparatus.

In another system, after the completion of the oxidation, the ammonium sulphate solution obtained is removed into another apparatus, and then, by cooling or dissolving ammonium sulphite or its constituents, crystalline ammonium sulphate or salts containing it is deposited.

After separating the deposits therefrom, the filtrate may be used again in the oxidizing apparatus.

Having now particularly described and ascertained the nature of my said invention, and in what manner the same is to be performed, I declare that what I claim is:

1. The process for manufacturing ammonium sulphate or salts containing the same, consisting in dissolving ammonium sulphite in saturated solution of ammonium sulphate while maintaining the proportion between ammonia and sulphurous acid contained therein in such proportion that they form normal ammonium sulphite, a small excess of sulphurous acid existing beside normal ammonium sulphite; and in subjecting said solution to the action of oxygen under pressure in the presence of catalyzers.

2. Process for manufacturing ammonium sulphate or salts containing the same, consisting in dissolving ammonium sulphite in saturated solution of ammonium sulphate containing salts of alkalis while maintaining the proportion between ammonia and sulphurous acid contained therein in such a proportion that they form normal ammonium sulphite, a small excess of sulphurous acid existing beside normal ammonium sulphite; and in subjecting said solution to the action of oxygen under pressure in the presence of catalyzers.

3. Process for manufacturing ammonium sulphate or salts containing the same, consisting in dissolving ammonium sulphite in saturated solution of ammonium sulphate containing salts of alkaline earth metals, while maintaining the proportion between ammonia and sulphurous acid contained therein in such a proportion that they form normal ammonium sulphite, a small excess of sulphurous acid existing beside normal ammonium sulphite; and in subjecting said solution to the action of oxygen under pressure in the presence of catalyzers.

4. Process for manufacturing ammonium sulphate or salts containing the same, consisting in dissolving ammonium sulphite in saturated solution of ammonium sulphate containing salts of alkaline earth metals, while maintaining the proportion between ammonia and sulphurous acid contained therein in such a proportion that they form normal ammonium sulphite, a small excess of sulphurous acid existing beside normal ammonium sulphite; and in subjecting said solution to the action of gases containing oxygen under high pressure in the presence of catalyzers.

In testimony whereof I hereunto affix my signature.

SHOICHIRO HORI.